United States Patent
Naegele et al.

(10) Patent No.: US 6,212,946 B1
(45) Date of Patent: Apr. 10, 2001

(54) SECURING MEANS FOR A DEVICE FOR DETECTING THE PRESSURE AND TEMPERATURE IN THE INTAKE TUBE OF AN INTERNAL COMBUSTION ENGINE

(75) Inventors: Erwin Naegele, Hessigheim; Winfried Kuhnt, Stuttgart; Klaus Hirschberger, Schwieberdingen; Uwe Lipphardt, Reutlingen, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/194,147

(22) PCT Filed: Dec. 5, 1997

(86) PCT No.: PCT/DE97/02841

§ 371 Date: Nov. 23, 1998

§ 102(e) Date: Nov. 23, 1998

(87) PCT Pub. No.: WO98/43056

PCT Pub. Date: Oct. 1, 1998

(30) Foreign Application Priority Data

Mar. 21, 1997 (DE) .............................. 197 11 939

(51) Int. Cl.$^7$ .............................. G01M 19/00; G01P 5/00
(52) U.S. Cl. ............................................. 73/118.2
(58) Field of Search .............................. 73/714, 706, 708, 73/756, 118.1, 118.2; 123/41.1, 198 D, 403

(56) References Cited

U.S. PATENT DOCUMENTS

| 4,796,584 | * | 1/1989 | Goto et al. | 123/403 |
| 5,036,808 | * | 8/1991 | Stumpp | 123/198 D |
| 5,505,164 | * | 4/1996 | Hollis | 123/41.1 |

* cited by examiner

Primary Examiner—William Oen
(74) Attorney, Agent, or Firm—Ronald E. Greigg; Edwin E. Greigg

(57) ABSTRACT

A device for detecting the pressure and the temperature in the intake tube of an internal combustion engine, including a temperature sensor, a pressure sensor and a substrate each of which are secured in a housing with as little stress as possible with the pressure sensor secured on a substrate together with an evaluation circuit. The temperature sensor measures precise temperature measurement. In order to introduce a fluid medium that is under pressure, a neck part is secured to the housing and an adapter is joined both to the substrate and to the neck part via adhesive seals that decouple mechanical stress from the pressure and temperature detectors.

21 Claims, 5 Drawing Sheets

SECURING MEANS FOR A DEVICE FOR DETECTING THE PRESSURE AND TEMPERATURE IN THE INTAKE TUBE OF AN INTERNAL COMBUSTION ENGINE

PRIOR ART

The invention relates to a device for detecting the pressure and the temperature in the intake tube of an internal combustion engine, wherein a temperature sensor and a pressure sensor, secured with little stress on a substrate together with an evaluation circuit, are disposed in a common housing.

A device for detecting the pressure and the temperature in the intake tube of an internal combustion engine, in which a temperature sensor and a pressure sensor are disposed in a common housing, is disclosed for instance in German Patent DE 28 51 716C1.

The combination of a pressure sensor, derived for instance from German Patent Disclosure DE 43 17 312 A1, and a temperature sensor is shown in FIG. 5.

In the pressure sensor shown in FIG. 5, a single-chip silicon pressure sensor (not shown) is used that includes a sensor cell, in which the pressure is introduced to the back side of a diaphragm, while a reference vacuum is provided on the front side of the diaphragm, for measuring the absolute pressure. The pressure sensor is accommodated in a hermetically sealed housing 82, which in turn is disposed in the housing 80 of the overall device for detecting the pressure and the temperature. Also disposed in the housing 80 is a printed circuit board 83 with capacitors, which are required for the sake of electromagnetic compatibility. The printed circuit board 83 is also used to connect with flat plug contacts 84, which are disposed on a neck 85 molded onto the housing 80.

A temperature sensor 86 in the form of an NTC resistor, which is injected into a tubular plastic sheath 87, is also disposed in a pressure neck 88, and its connection leads are electrically conductively connected to flat plug contacts 84 via inlet parts 90 that are welded to the NTC wires.

Not only is this kind of device for detecting the pressure and temperature very complicated to produce, but for instance the electrical connections between the connection leads of the temperature sensor 86 and of the pressure sensor 82 and the printed circuit board 85 and the flat plug contacts 84 must be made by a soldered connection in the fully installed state. Then this soldered connection has to be potted, for instance with an adhesive compound 89, for sealing purposes.

Another problematic aspect of such a device is that the temperature sensor 86 is disposed in a plastic sheath 87, because the result of this, for many applications, is an overly long response time of the temperature sensor 86.

Devices for detecting pressure and temperature in the intake tube of an internal combustion engine are also known in which the pressure sensor is subjected to the pressure on its front side. The actual pressure sensor itself is disposed on a glass base. A reference vacuum is enclosed between the glass base and the pressure sensor. The pressure sensor, in the form of a chip, is surrounded by a tiny frame and is protected against environmental factors by a protective gel. Such devices again require expensive and sometimes complicated production. Moreover, it cannot be precluded that via the housing, voltages and the like will be transmitted to the very sensitive pressure sensor and make the measurement outcome incorrect.

It is therefore the object of the invention to refine a device for detecting the pressure and the temperature in the intake tube of an internal combustion engine of the generic type in question, in such a way that while it is simple to produce, it enables a precise temperature measurement and in particular a very precise pressure measurement.

ADVANTAGES OF THE INVENTION

In a device for detecting the pressure and the temperature in the intake tube of an internal combustion engine of the type described at the outset, this object is attained according to the invention in that to introduce a medium that is under pressure, a neck part secured to the housing and an adapter, joined both to the substrate and to the neck part via adhesive seals that decouple mechanical stress are provided.

The two-part embodiment of the pressure connection by means of the neck part and the adapter, where the adapter is connected merely through adhesive seals to the substrate and the neck part, so that mechanical stresses are maximally decoupled, has the particularly major advantage that the measurement precision of the pressure measurement is increased by this design, since stresses that act for instance on the housing or the pressure connection are not transmitted to the pressure sensor. Moreover, by this relatively simple mechanical design, easy and unproblematic production of the entire device is assured.

The substrate to which the pressure sensor is secured may purely in principle be secured to the housing in the most various ways. A particularly advantageous embodiment, which in particular enables very good pressure decoupling, provides that the substrate in the housing is merely glued on at predetermined contact points. These contact points are selected such that as few stresses as possible that adulterate the pressure measurement are transmitted to the pressure sensor.

To protect the pressure sensor from environmental factors, it is advantageously provided that a ring is disposed around the pressure sensor, and that the interstice between the ring and the sensor is filled with a chemical gel.

As the chemical gel, a fluorine-silicone gel has proved especially advantageous.

With regard to the disposition of the temperature sensor in the device, once again the most various embodiments are possible. To enable especially direct coupling of the temperature sensor to the medium to be measured, it is advantageously provided in one exemplary embodiment that the temperature sensor is secured to the neck part in such a way that it protrudes into the interior thereof.

Particularly with a view to especially simple mounting of the temperature sensor, it is provided that the connection leads of the temperature sensor can be clamped, by a resilient clamp molded onto the neck part, to two jaws embodied on the neck part. In this way, the temperature sensor can not only be mounted and positioned on the neck part in a very simple way, but moreover, because of the clamping connection provided through the clips, it becomes possible to secure the connection leads of the temperature sensor in a way free of damage.

In order to assure that the temperature sensor and its connection leads will not be corroded or damaged and attacked by other environmental factors, it is advantageously provided that the temperature sensor and its connection leads are coated with a protective paint or a protective coating.

Preferably, the protective paint is a polyester amide paint.

Particularly with a view to good contacting, which can be established by means of especially simple mounting and assembly, it is also preferably provided that for contacting the connection leads of the temperature sensor with plug contact pins that are disposed in the housing and extended to the outside, insulation displacement contacts are provided.

BRIEF DESCRIPTION OF THE DRAWINGS

Further characteristics and advantages of the invention are the subject of the ensuing description and the drawings of several exemplary embodiments.

DESCRIPTION OF AN EXEMPLARY EMBODIMENT

Figure 1:
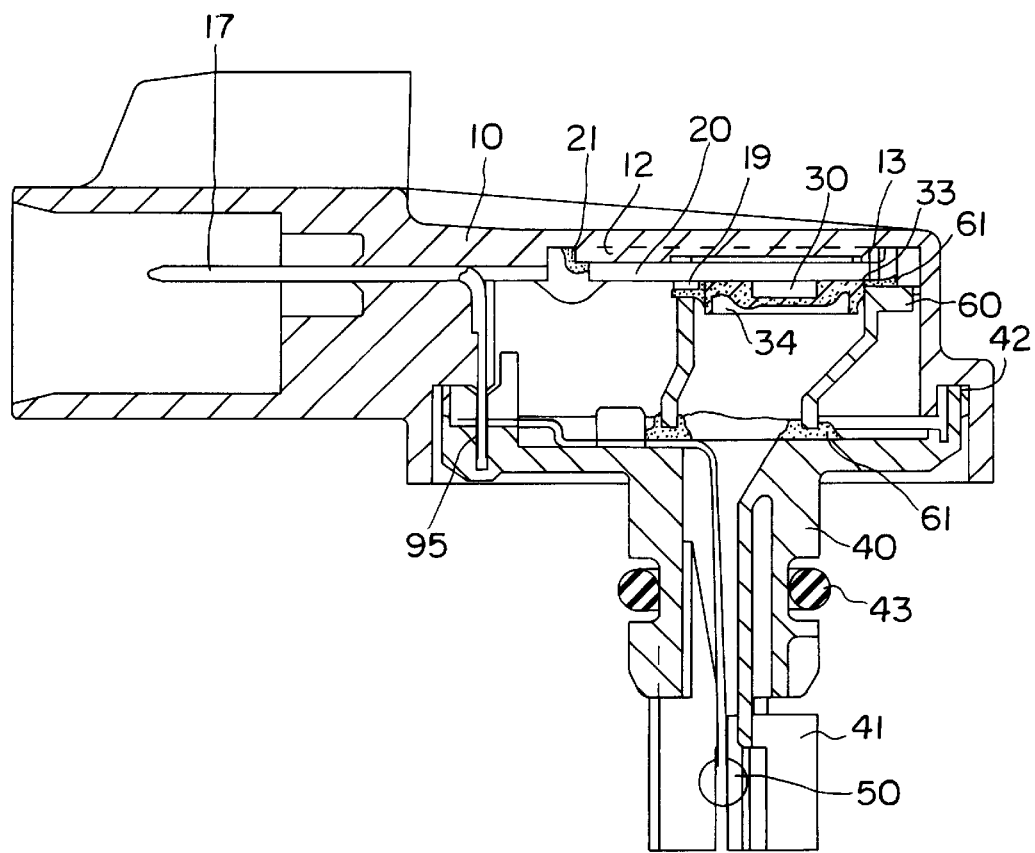
FIG. 1 illustrates a sectional view of a device according to the invention for detecting the pressure and the temperature in the intake tube of an internal combustion engine.
Figure 2:
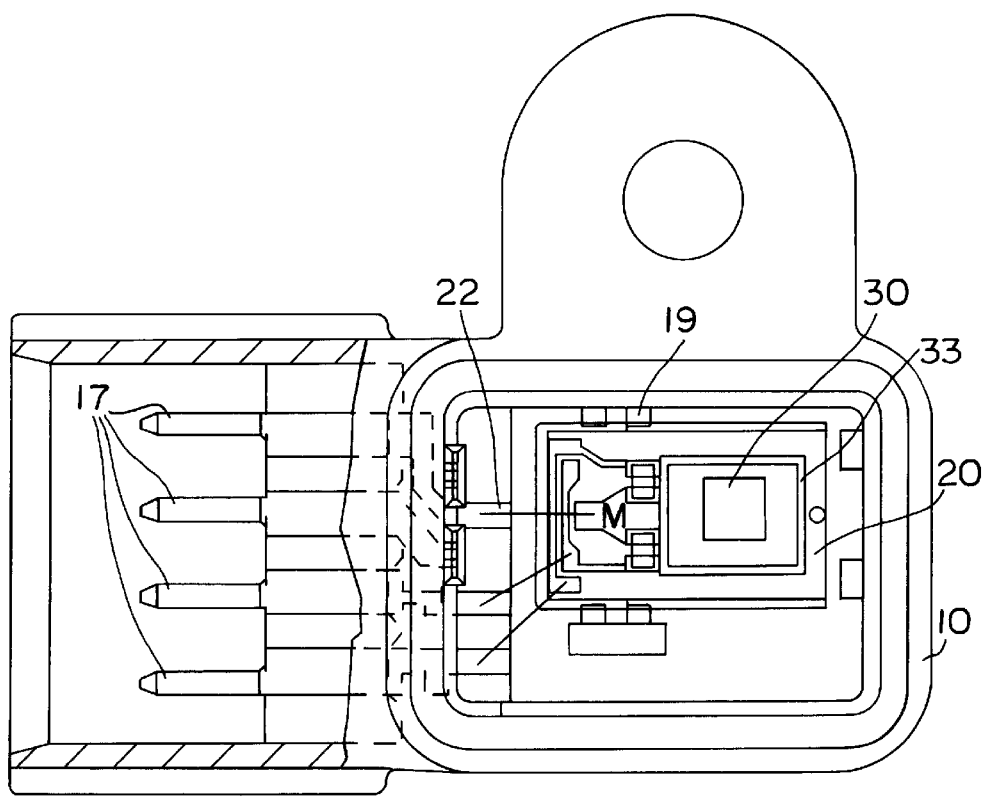
FIG. 2 illustrates a plan view on the device of the invention shown in FIG. 1.

One exemplary embodiment of a device for detecting the pressure and the temperature in the intake tube of an internal combustion engine, shown in FIGS. 1–4, includes a housing, designated overall by reference numeral 10, in which a substrate 20, for instance a hybrid, is secured via adhesive connections 21.

The substrate 20 is not glued over its entire surface to a surface, intended for the purpose, of the housing 10, so that forces that act on the housing, such as warping of the housing 10, or forces that arise when the housing is screwed on, can be kept away from the substrate 20 and thus away from a pressure sensor 30 disposed on it.

It is therefore only in the region of its bond lands, that is, where the bond wires 22 are contacted, that the substrate 20 is glued to a rib 12 specifically provided for the purpose. On the side remote from this rib 12, conversely, the substrate 20 is glued to only a single contact point 13.

At the location where the pressure sensor 30 is secured to the substrate 20, however, the substrate 20 is free, i.e., unglued, so that no bending moments can be transmitted from the housing 10 to the substrate 20 and thereby to the pressure sensor 30 disposed on the substrate as well. The adhesive connection between the substrate 20 and the housing 10 is hardened before bonding.

The pressure sensor 30, known per se, disposed on the substrate 20 has a glass base and a silicon chip, disposed on the glass base; a Wheatstone bridge of piezoresistive resistance elements, for instance, is disposed on the surface of the chip. The diaphragm required for the pressure detection is produced by etching the backside of the silicon chip. The joining of the silicon chip to the glass base is done under a vacuum, so that subsequently, there is a vacuum in the cavern etched out. The pressure sensor 30 is surrounded by a ring 33, for instance an IC ring. The interstice 34 between the ring 33 and the pressure sensor 30 is filled with a fluorine-silicone gel. By means of this fluorine-silicone gel, it is assured that the pressure sensor 30, including its thin-wire gold bonds, is guarded against touch and against contact with media, such as gasoline or exhaust gas condensate, that are present in an internal combustion engine. The ring 30 acts both as a boundary for the fluorine-silicone gel from the outside and as protection against media, such as adhesive, entering from the outside.

A neck part 40 is disposed in the lower region of the housing 10 and is joined to the housing part 10 by an adhesive connection 42. In the neck part 40, which protrudes into the interior of the intake tube and is sealed off there by an O-ring 43, there is a temperature sensor 50, for instance an NTC resistor.

An adapter 60 is disposed between the neck part 40 and the pressure sensor 30 that is disposed on the substrate 20. The adapter 60 is joined both to the substrate 20/housing 10 and to the neck part 40 via adhesive seals 61 that decouple mechanical stresses.

To secure the adapter 60, bearing faces 19 provided specifically for the purpose are provided on the housing 10. The securing of the adapter 60 by the adhesive seals 61 is embodied such that the adapter 60 rests on the housing 10 only on the bearing faces 19, and that along a bead of adhesive around the ring 33 a constant adhesive gap from the substrate 20 results, by means of which the substrate 20 is mechanically decoupled against stress.

The adhesive bead at the same time serves as a direct covering for the electrical conductor tracks (not shown) around the ring 33 and also serves to form and seal off a pressure cell inside the housing of the pressure sensor 30.

By means of the adhesive seals 61, the transmission of mechanical stresses, pressures and the like to the substrate 20 and particularly to the pressure sensor 30, is especially effectively avoided.

As can be seen from FIG. 1, the height of the adapter 60 is selected such that in the mounted state, once again there is a constant adhesive gap of the adhesive seal 61 between the neck part 40 and the adapter 60, and this gap decouples forces that could be transmitted from the neck part 40 to the adapter 60.

The adapter 60 therefore serves merely to seal off the pressure cell, while forces arising from the securing of the housing 10 and from a pressure load are absorbed by the less-elastically embodied adhesive connection 42 between the housing 10 and the neck 40.

Figure 3:
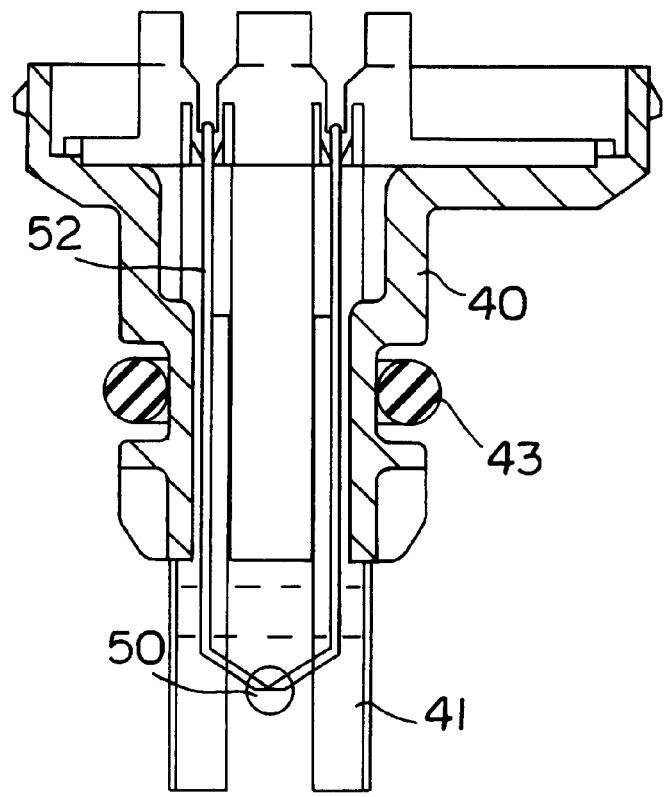
FIG. 3 illustrates a detail showing the neck part of the device of the invention shown in FIG. 1, along with a schematic plan view of a clip, disposed on the neck part, that is used to secure a temperature sensor.
Figure 3A:
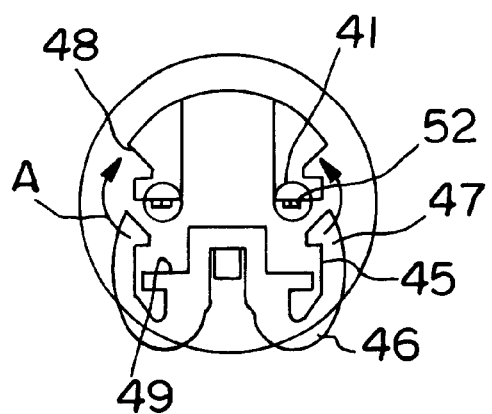
FIG. 3a is a schematic plan view of a clip disposed on the neck part of the device shown in FIG. 3.

As can be seen from FIGS. 1 and 3, the temperature sensor 50 in the form of an NTC resistor is secured by means of a resilient clip 45 molded onto the neck part 40. The clip 45 is shown in the unmounted state in the lower part of FIG. 3. For securing the connection leads 52 of the temperature sensor 50, two jaws 46, which in their forward region toward the connection leads 52 of the temperature sensor 50 have detent protrusions 47, are pressed in such a way into detent openings 48 provided on the clip 45, along directions indicated by the arrows A, that clamping faces 49 formed onto the jaws 46 come to rest on the connection leads 52 of the temperature sensor 50 and firmly clamp them to jaws 41 that are molded onto the neck part 40.

The clip 45 is designed such that the O-ring 43 for sealing the neck part 40 can be slipped onto the neck part 40 only once the temperature sensor 50 has already been secured on the neck part 40 by the clip connection described.

Figure 4:
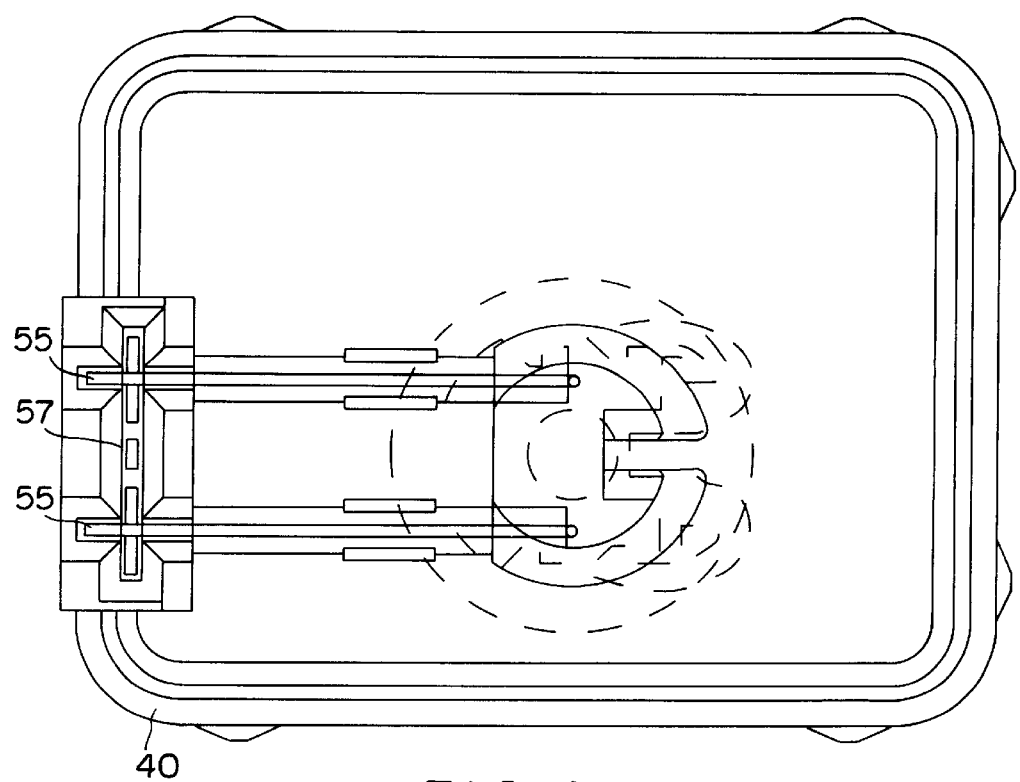
FIG. 4 illustrates a plan view, partly cut away, of the housing of the device of the invention shown in FIG. 1, to illustrate the insulation displacement contacts (IDCs)
Figure 5:
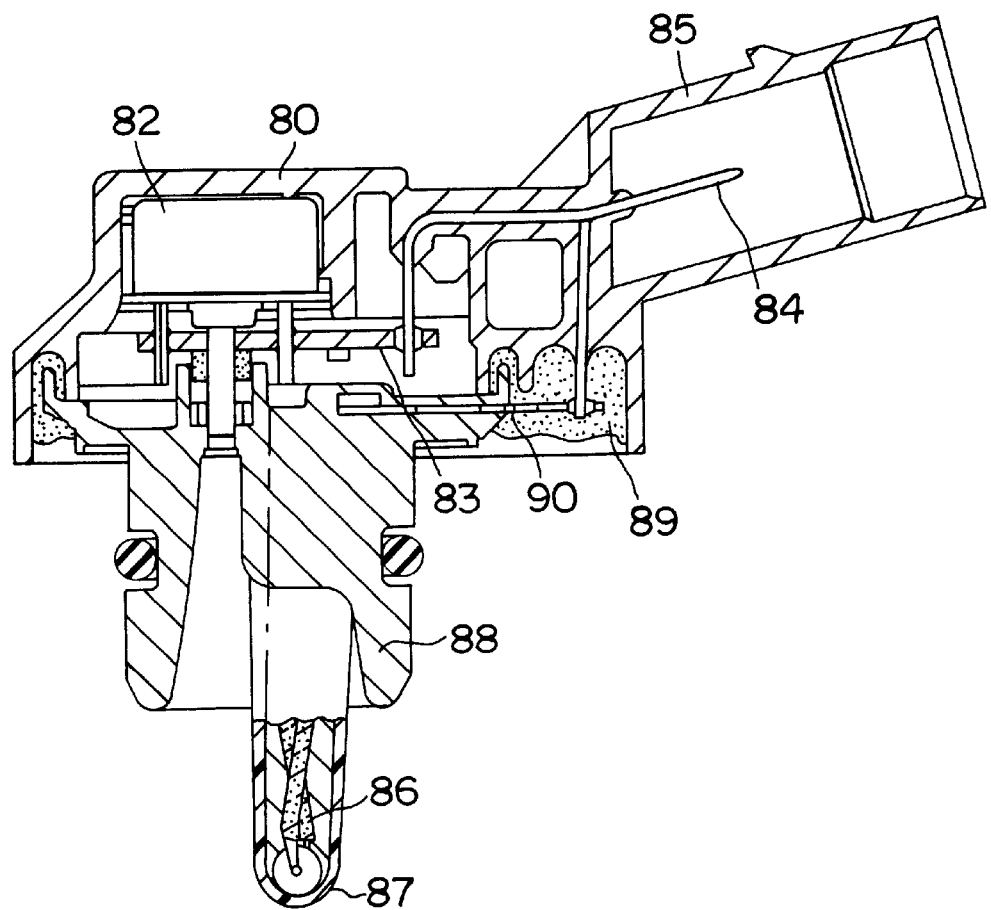
FIG. 5 illustrates a device, known from the prior art, for detecting the pressure and the temperature in the intake tube of an internal combustion engine.

The connection leads 52 of the temperature sensor 50, which are angled by approximately 90°, are electrically conductively connected to plug contact pins 17 by means of an IDC 55, which is shown particularly in FIGS. 1 and 4. The plug contact pins 17 to that end have V-shaped openings 57 in their lower region, into which openings the connection leads 52 of the temperature sensor 50 are pressed.

Both the temperature sensor 50 and its connection leads 52 are coated with a polyester imide protective paint, by which not only is protection against media acting on the temperature sensor 50 and its connection leads 52 from outside is accomplished but also an especially favorable response time of the temperature sensor is attained.

The foregoing relates to a preferred exemplary embodiment of the invention, it being understood that other variants and embodiments thereof are possible within the spirit and scope of the invention, the latter being defined by the appended claims.

What is claimed is:

1. A device for detecting a pressure and a temperature in an intake tube of an internal combustion engine, which comprises a temperature sensor (50), a pressure sensor (30) and a substrate (20), said temperature sensor (50), said pressure sensor (30) and said substrate (20) are disposed in a common housing (10), said pressure sensor (30) is secured with as little stress as possible on said substrate (20) together with an evaluation circuit, a neck part (40) is secured to the housing (10), said neck part (40) introduces a medium that is under pressure into an adapter (60), which joins both the substrate (20) and the neck part (40) via adhesive seals (61) that decouple mechanical stress.

2. The device according to claim 1, in which the substrate (20) in the housing (10) is glued only at predetermined contact points (12, 13).

3. The device according to claim 1, in which a ring (33) is disposed around the pressure sensor (30), and that an interstice (34) between the ring (33) and the pressure sensor (30) is filled with a chemical gel.

4. The device according to claim 2, in which a ring (33) is disposed around the pressure sensor (30), and that an interstice (34) between the ring (33) and the pressure sensor (30) is filled with a chemical gel.

5. The device according to claim 3, in which the chemical gel is a fluorine-silicone gel.

6. The device according to claim 1, in which the temperature sensor (50) is secured to the neck part (40) in such a way that the temperature sensor (50) protrudes into the interior thereof.

7. The device according to claim 2, in which the temperature sensor (50) is secured to the neck part (40) in such a way that the temperature sensor (50) protrudes into the interior thereof.

8. The device according to claim 3, in which the temperature sensor (50) is secured to the neck part (40) in such a way that the temperature sensor (50) protrudes into the interior thereof.

9. The device according to claim 4, in which the temperature sensor (50) is secured to the neck part (40) in such a way that the temperature sensor (50) protrudes into the interior thereof.

10. The device according to claim 6, in which connection leads (52) of the temperature sensor (50) are clamped, by a resilient clamp (45) molded onto the neck part (40), to two jaws (41) embodied on the neck part (40).

11. The device according to claim 7, in which connection leads (52) of the temperature sensor (50) are clamped, by a resilient clamp (45) molded onto the neck part (40), to two jaws (41) embodied on the neck part (40).

12. The device according to claim 8, in which connection leads (52) of the temperature sensor (50) are clamped, by a resilient clamp (45) molded onto the neck part (40), to two jaws (41) embodied on the neck part (40).

13. The device according to claim 9, in which connection leads (52) of the temperature sensor (50) are clamped, by a resilient clamp (45) molded onto the neck part (40), to two jaws (41) embodied on the neck part (40).

14. The device according to claim 10, in which the temperature sensor (50) and its connection leads (52) are coated with a protective paint or a protective coating.

15. The device according to claim 11, in which connection leads (52) of the temperature sensor (50) are clamped, by a resilient clamp (45) molded onto the neck part (40), to two jaws (41) embodied on the neck part (40).

16. The device according to claim 12, in which connection leads (52) of the temperature sensor (50) are clamped, by a resilient clamp (45) molded onto the neck part (40), to two jaws (41) embodied on the neck part (40).

17. The device according to claim 13, in which connection leads (52) of the temperature sensor (50) are clamped, by a resilient clamp (45) molded onto the neck part (40), to two jaws (41) embodied on the neck part (40).

18. The device according to claim 14, in which the protective paint is a polyester amide paint.

19. The device according to claim 10, in which insulation displacement contacts (55) are provided for contacting the connection leads (52) of the temperature sensor (50) with plug contact pins (17) that are disposed in the housing (10) and extended to the outside.

20. The device according to claim 14, in which insulation displacement contacts (55) are provided for contacting the connection leads (52) of the temperature sensor (50) with plug contact pins (17) that are disposed in the housing (10) and extended to the outside.

21. The device according to claim 18, in which insulation displacement contacts (55) are provided for contacting the connection leads (52) of the temperature sensor (50) with plug contact pins (17) that are disposed in the housing (10) and extended to the outside.

* * * * *